(12) United States Patent
Pitchforth, Jr.

(10) Patent No.: US 8,797,838 B2
(45) Date of Patent: *Aug. 5, 2014

(54) INTELLIGENT NETWORK RESTORATION

(75) Inventor: Donald Pitchforth, Jr., Rockwall, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 633 days.

This patent is subject to a terminal disclaimer.

(21) Appl. No.: 12/878,386

(22) Filed: Sep. 9, 2010

(65) Prior Publication Data

US 2011/0010589 A1    Jan. 13, 2011

Related U.S. Application Data

(63) Continuation of application No. 11/772,053, filed on Jun. 29, 2007, now Pat. No. 7,830,784.

(51) Int. Cl.
*H04L 12/26* (2006.01)

(52) U.S. Cl.
USPC .......................................... 370/216; 370/225

(58) Field of Classification Search
USPC ................................. 370/216–228
See application file for complete search history.

(56) References Cited

U.S. PATENT DOCUMENTS

| 7,242,664 | B2 | 7/2007 | Einstein et al. | |
|---|---|---|---|---|
| 7,830,784 | B2* | 11/2010 | Pitchforth, Jr. | 370/216 |
| 2001/0046207 | A1 | 11/2001 | Isonuma et al. | |
| 2002/0129166 | A1* | 9/2002 | Baxter et al. | 709/246 |
| 2002/0186654 | A1* | 12/2002 | Tornar | 370/225 |
| 2003/0185148 | A1 | 10/2003 | Shinomiya et al. | |
| 2004/0091032 | A1 | 5/2004 | Duchi et al. | |
| 2004/0196783 | A1 | 10/2004 | Shinomiy | |
| 2005/0013241 | A1 | 1/2005 | Beller et al. | |
| 2005/0018599 | A1 | 1/2005 | Mahasoom et al. | |
| 2005/0108444 | A1 | 5/2005 | Flauaus et al. | |
| 2005/0259570 | A1 | 11/2005 | Hayashi et al. | |
| 2007/0053283 | A1* | 3/2007 | Bidwell et al. | 370/216 |
| 2007/0153674 | A1 | 7/2007 | Alicherry et al. | |
| 2008/0068983 | A1* | 3/2008 | Dunbar et al. | 370/216 |
| 2008/0225696 | A1 | 9/2008 | Saleh et al. | |

* cited by examiner

*Primary Examiner* — Afshawn Towfighi

(57) ABSTRACT

A device may isolate a first failure of a network interface that transports packets from one point in a network to another point in the network, may detect a subsequent failure of the interface, and may identify a recovery of the network interface from the subsequent failure. In addition, the device may restore the network interface to the network to enable the interface to transport packets after a wait-to-restore period that is approximately greater than or equal to a time difference between when the first failure and the subsequent failure occur.

20 Claims, 7 Drawing Sheets

INTELLIGENT NETWORK RESTORATION

RELATED APPLICATION

This application is a continuation of U.S. patent application Ser. No. 11/772,053 filed Jun. 29, 2007, the disclosure of which is incorporated herein by reference.

BACKGROUND INFORMATION

A network may encounter many types of problems during its operation, such as a device failure, network card failure, network congestions, etc. To avoid extended downtime or delays in communication, a typical network element may be equipped with a protection system. If the network element detects a problem at one of its communication paths, the network element may automatically switch from a failed path to a working path.

DETAILED DESCRIPTION OF PREFERRED EMBODIMENTS

Figure 1:
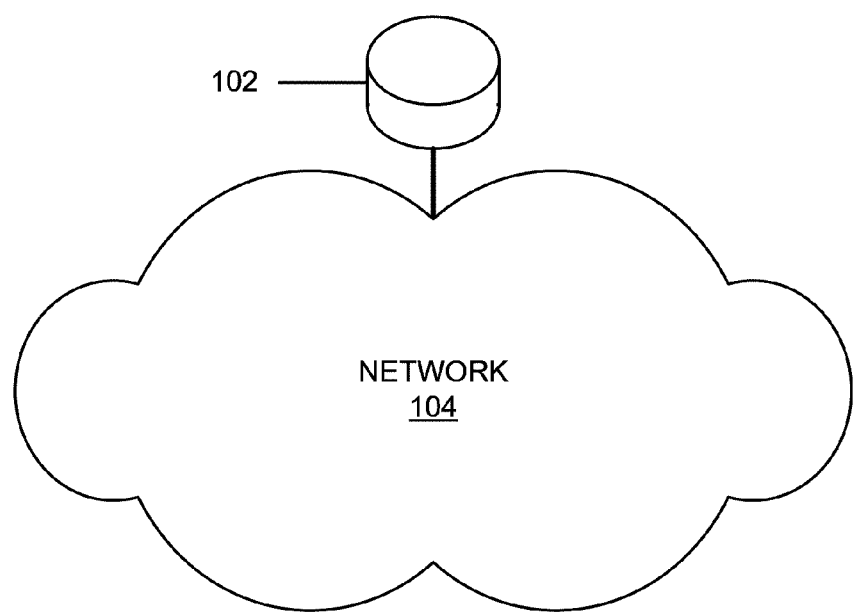
FIG. 1 shows a network in which concepts described herein may be implemented.

The following detailed description refers to the accompanying drawings. The same reference numbers in different drawings may identify the same or similar elements. In addition, while some of the following description is provided mainly in the context of routers or other network elements at layer 2 and/or layer 3 of the Open Systems Interconnection (OSI) Model, the principles and teachings may be applied to different types of network devices at different layers of communication (e.g., a Multi-protocol label switching (MPLS) routers, a Synchronous Optical Network (SONET) element (e.g., add-drop multiplexers, terminal multiplexers, regenerators, etc.), a Gigabit Passive Optical network (GPONs) switches, a Synchronous Digital Hierarchy (SDH) network elements, etc.).

The term "failure," as used herein, may refer to a malfunction of a device or a network path, as well as a device or a path condition that no longer provides a required quality-of-service (QOS). For example, if a network service requires packets that travel through a path to be delayed less than 100 milliseconds and if the path delays the packets for longer than 100 milliseconds, the path may be deemed as having "failed."

The term "recovery," as used herein, may refer to a recovery of original functions of a failed device or a recovery of the ability of a network path to carry data in its original capacity prior to a failure.

The term "restore" or "restoration," as used herein, may refer to reintegrating a recovered path or interface as part of a network, of which the recovered path or the interface has been part prior to the failure.

The term "alarm," as used herein, may refer to notifications or error messages that indicate defects and anomalies within a network. In addition, an alarm may signal a restore and/or a recovery. Examples of alarms may include a loss of signal (LOS) alarm, a loss of frame (LOF) alarm, a line alarm indication signal (AIS-L), a packet loss alarm, a packet delay alarm, etc.

The term "report," as used herein, may refer to information related to a failure, restore, and/or recovery. A report may possibly include information in an alarm, as well as other types of information, such as time between consecutive failures, an action taken by a restore mechanism, a device at which a failure, a restore, and/or a recovery occurs (e.g., a port number, a network address, etc.), a summary of switching events for the recovery/restore, etc.

In the following, a system may intelligently restore a network after one or more failures. If a system detects a second failure at a path or an interface in the network after the first restore, the system may switch its network paths to continue to render network services. In addition, the system may measure the duration of time between the first failure and the second failure. If the system determines that the failed path/interface is capable of resuming its original operation, the system may wait for a period of time equivalent to the measured duration before restoring the path/interface. Should the system experience additional failures at the same path/interface, the system may use the longest period between recent consecutive failures as its wait period before restoring the network. In the above, the system "intelligently restores" the network paths in the sense that the system accounts for the preceding failures in adjusting the wait period before restoring the network. During the failures, recoveries, and restores, the system may send out reports to network element management devices.

FIG. 1 shows an exemplary network in which concepts described herein may be implemented. As shown, network 100 may include network element 102 and a network 104. In practice, network 100 may include additional elements than those illustrated in FIG. 1. Network element 102 may include devices for performing network-related functions, such as a router or a switch (e.g., a provider edge (PE) router in a MPLS network). Network 104 may include the Internet, an ad hoc network, a local area network (LAN), a wide area network (WAN), a metropolitan area network (MAN), a cellular network, a public switched telephone network (PSTN), any other network, or a combination of networks. Network element 102 may communicate with other network elements in network 104 through a wired or wireless communication link.

Figure 2:
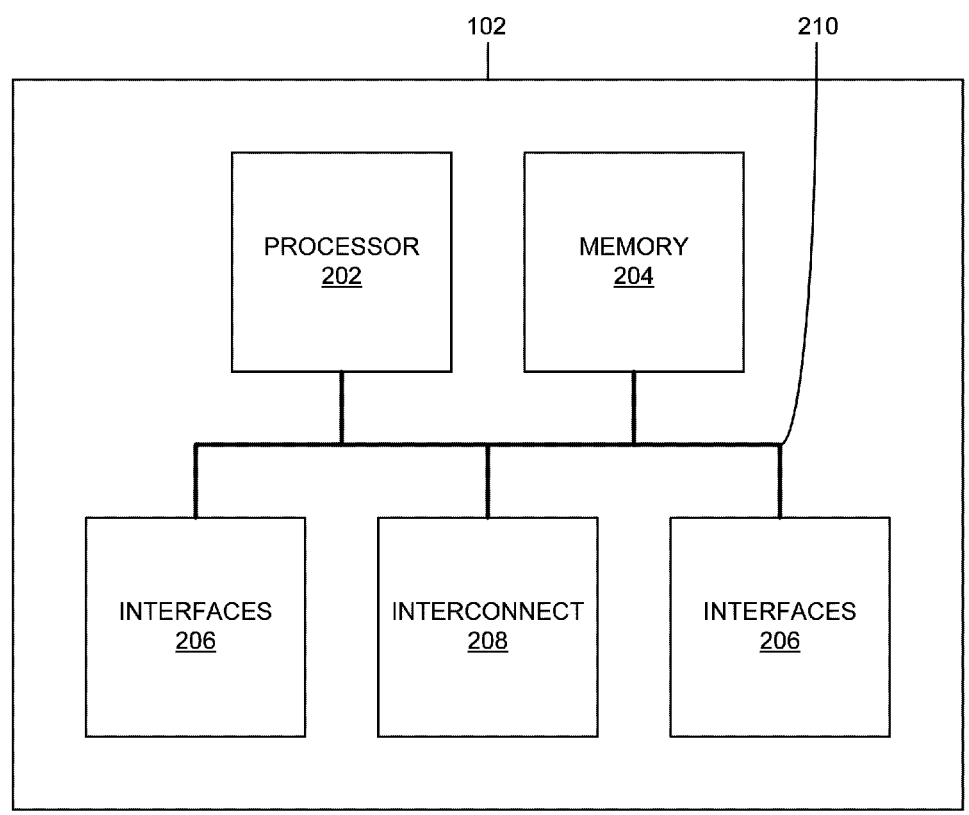
FIG. 2 is a block diagram of an exemplary device of FIG. 1.

FIG. 2 shows an exemplary block diagram of network element 102. As shown, network element 102 may include a processor 202, memory 204, interfaces 206, an interconnect 208, and a bus 210. In other implementations, network element 102 may include fewer, additional, or different components than those illustrated in FIG. 2.

Processor 202 may include one or more processors, microprocessors, application specific integrated circuits (ASICs), field programming gate arrays (FPGAs), and/or processing logic optimized for networking and communications. Memory 204 may include static memory, such as read only memory (ROM), dynamic memory, such as random access memory (RAM), for storing data and machine-readable instructions. Memory 204 may also include storage devices, such as a floppy disk, a CD ROM, a CD read/write (R/W) disc, and/or flash memory, as well as other types of storage devices. Interfaces 206 may include devices for receiving incoming data streams from networks and for transmitting data to networks (e.g., Ethernet card, optical carrier (OC) interfaces, asynchronous transfer mode (ATM) interfaces, etc.). Interconnect 208 may include one or more switches or switch fabrics for directing incoming network traffic from one or more of interfaces 206 to others of interfaces 206. Bus 210 may include a path that permits communication among processor 202, memory 204, interfaces 206, and/or interconnects 208.

Depending on implementation, the components that are shown in FIG. 2 may provide fewer or additional functionalities. For example, if network element 102 performs an Internet Protocol (IP) packet routing function as part of a MPLS router, processor 202 may perform tasks associated with obtaining routing information from other routers in a MPLS network. In such cases, conveying network traffic from one interface to another may involve label based routing, rather than IP address based routing.

Figure 3:
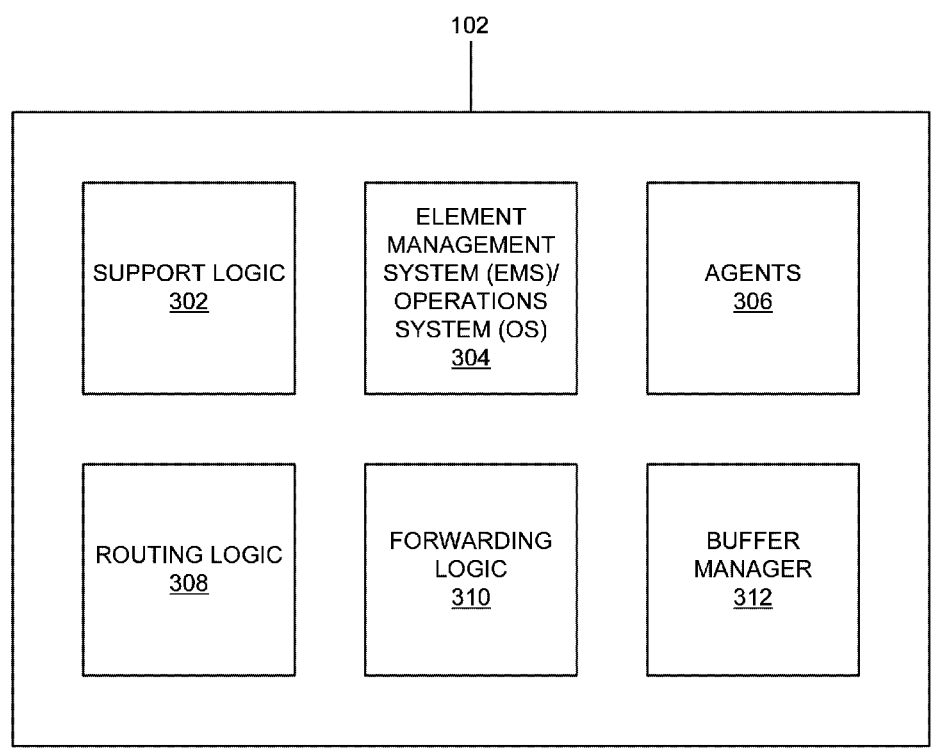
FIG. 3 is an exemplary functional block diagram of the device of FIG. 1.

FIG. 3 is a functional block diagram of a network element 102 that includes a router. As shown, network element 102 may include support logic 302, element management system (EMS)/operations system (OS) 304, agents 306, routing logic 308, forwarding logic 310, and buffer manager 312. In different implementations, network element 102 may include fewer, additional, or different components than those illustrated in FIG. 3. For example, network element 102 may or may not provide network management functions, and in such instances, network element 102 may possibly not include EMS/OS 304 or agents 306. In another example, if network element 102 does not participate in supporting a remote EMS/OS 304, network element 102 may possibly not include agents 306.

Support logic 302 may include hardware and/or software for performing various support functions for management and operation of network element 102 and/or other network elements. For example, support logic 302 may provide Transmission Control Protocol (TCP)/IP stack for facilitating communication between network element 102 and a remote EMS/OS. In another example, support logic 302 may provide a user interface via which a network administrator or a user can interact with network element 102. In yet another example, support logic 302 may provide software interfaces between components of FIG. 3 (e.g., interfaces 206) and components of FIG. 4 (e.g., forwarding logic 310).

EMS/OS 304 may include hardware and/or software for service provisioning, operations support, network tools integration, and service assurance. Service provisioning may include supporting inventory management (e.g., keeping records of network elements), configuration management (e.g., control of sub-network resources, topologies, installation of equipment, etc.), assigning specific services to subscribers, and measurement of the usage of network resources. Operations support may include facilitating the use of EMS/OS 304 (e.g., a context sensitive help menus, a graphical desktop window, a low-cost operations platform, etc.). Network tools integration may include interfacing EMS/OS 304 with other types of resource management systems (e.g., transaction language (TL1) interfaces to send alarms to network management system (NMS), open database connectivity (ODBC), etc.).

Service assurance may include fault detection and isolation, collecting performance data, collecting data on network resource utilization, and ensuring quality-of-service (QOS). Fault detection and isolation may entail gathering alarms, reports, and fault messages that are provided by other network elements.

In many implementations, EMS/OS 304 may support transaction language (TL1), as defined in GR-831 by Telcordia Technologies. In some implementations, EMS/OS 304 may be compliant with a published recommendation by International Telecommunication Union-Telecommunications Standardization Sector (ITU-T), M.3010 on telecommunications management network (TMN), and may provide for the common management information protocol (CMIP) and/or the simple network management protocol (SNMP).

Agents 306 may include hardware and/or software for monitoring and/or controlling components on behalf of a specific EMS/OS that is associated with agents 306 and may communicate with the EMS/OS. The monitored components may include a physical device (e.g., a plug-in card, a multiplexer, a switch, etc.) or a logical device, such as a virtual connection or a logical interface. In monitoring the components, agent 306 may detect a fault or a recovery of an interface, an interconnect, or any other component of network element 102 and may provide a report of the fault or the recovery to the EMS/OS. For example, agents 306 may detect a failure of one of interfaces 206 and may send associated alarms or error messages to a remote EMS/OS. In another example, agents 306 may receive commands from a remote EMS/OS and may make appropriate configuration changes to interfaces 206. In some implementations, agents 306 may be attached or connected to other subcomponents of network element 102 that can perform tests on alarms, monitor paths, measure jitter, monitor network synchronization, etc.

Routing logic 308 may include hardware and/or software for communicating with other routers to gather and store routing information in a routing information base (RIB). Forwarding logic 310 may include hardware and/or software for directing a packet to a proper output port on one of interfaces 206 based on routing information in the RIB. Buffer manager 312 may provide a buffer for queuing incoming packets. If packets arrive simultaneously, one or more of the packets may be stored in the buffer until higher priority packets are processed and/or transmitted.

Figure 4:
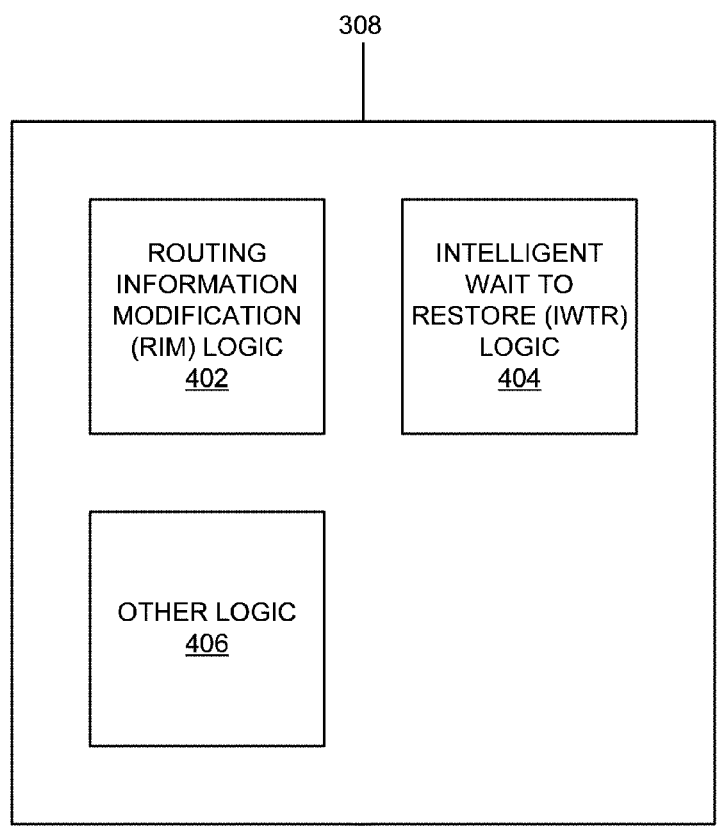
FIG. 4 is an exemplary functional block diagram of routing logic of FIG. 3.

FIG. 4 shows an exemplary functional block diagram of routing logic 308. As shown, routing logic 308 may include routing information modification (RIM) logic 402, intelligent wait to restore (IWTR) logic 404, and other logic 406. In different implementations, routing logic 308 may include fewer, additional, or different components than those illustrated in FIG. 4.

RIM logic 402 may include hardware and/or software for updating path information in accordance with available paths and for sharing path information with other network elements that include RIM logic. For example, if RIM logic 402 detects a failure of one of the routes in a RIB, RIM logic 402 may modify the RIB to indicate a particular route as being unavailable to network 100 and may send messages to other network elements in network 104, to notify them of the changes in its path information. In another example, RIM logic 402 may receive a notification from a network element in network 104 that a path has been restored and may update the RIB to indicate the change in network 104. In many implementations, RIM logic 402 may comply with routing protocols, such as constraint-based label distribution protocol (CR-LDP), enhanced interior gateway routing protocol (EIGRP), etc.

IWTR logic 404 may include hardware and/or software to intelligently restore a path/interface to a network after one or more failures in the path/interface. If IWTR logic 404 is notified of a second failure by one of agents 306 at a path/interface in the network after the first restore, IWTR logic 404 may modify its network paths via RIM logic 402 (i.e., make changes to its RIB) network element 102 to continue to render network services. In addition, IWTR logic 404 may measure the duration of time between the first failure and the second failure. If IWTR logic 404 determines that the failed path/interface is capable of resuming its original operation, IWTR logic 404 may wait for a period of time equivalent to the measured duration before restoring the paths via RIM logic 402. Should the network experience additional failures at the same path/interface, IWTR logic 404 may use the longest period between consecutive failures as its wait period before restoring the path/interface to the network.

If IWTR logic 404 detects failures, modifies network paths, and/or performs a recovery, IWTR logic 404 may generate alarms and/or reports. Each alarm or report may include the time of failure/recovery/restore, a type of failure/recovery/restore, switching events, and/or the severity of failure. In some implementations, IWTR logic 404 may provide a report after a restore, and the report may include a summary of the failure/recovery/restore and switching events. Depending on implementation, IWTR logic 404 may coordinate with agents 306 in generating alarms or reporting failures. For example, in one implementation, IWTR logic 404 may detect faults/recovery via agents 306, and generate alarms and/or reports that are directed to EMS/OS 304.

Other logic 406 may include hardware and/or software for performing functions that are not performed by RIM logic 402 and/or IWTR logic 404. For example, other logic 406 may perform traffic engineering related functions (i.e., locating network congestions, etc.).

Figure 5A:
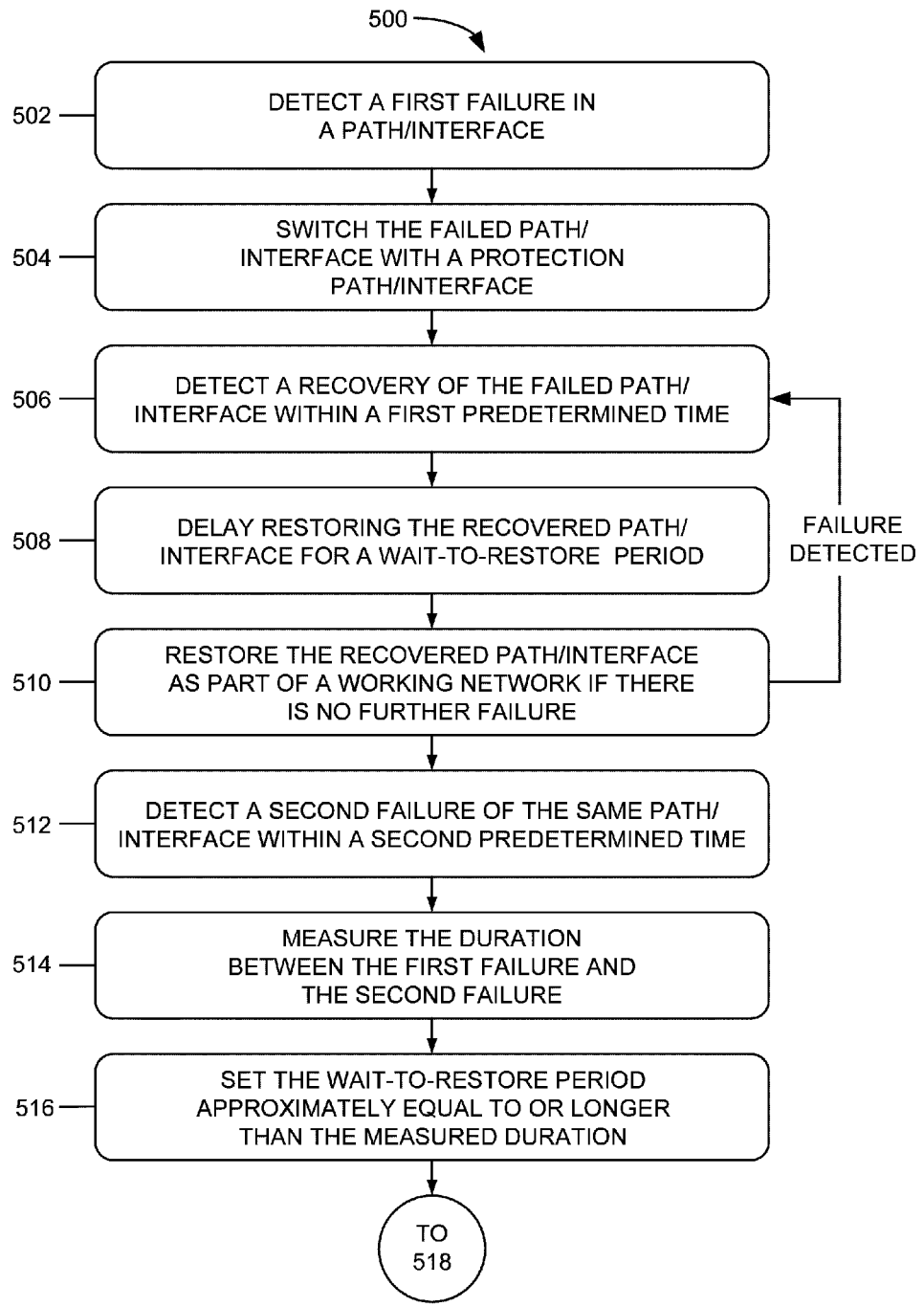
FIGS. 5A and 5B are flowcharts of an exemplary process for intelligently restoring a network.
Figure 5B:
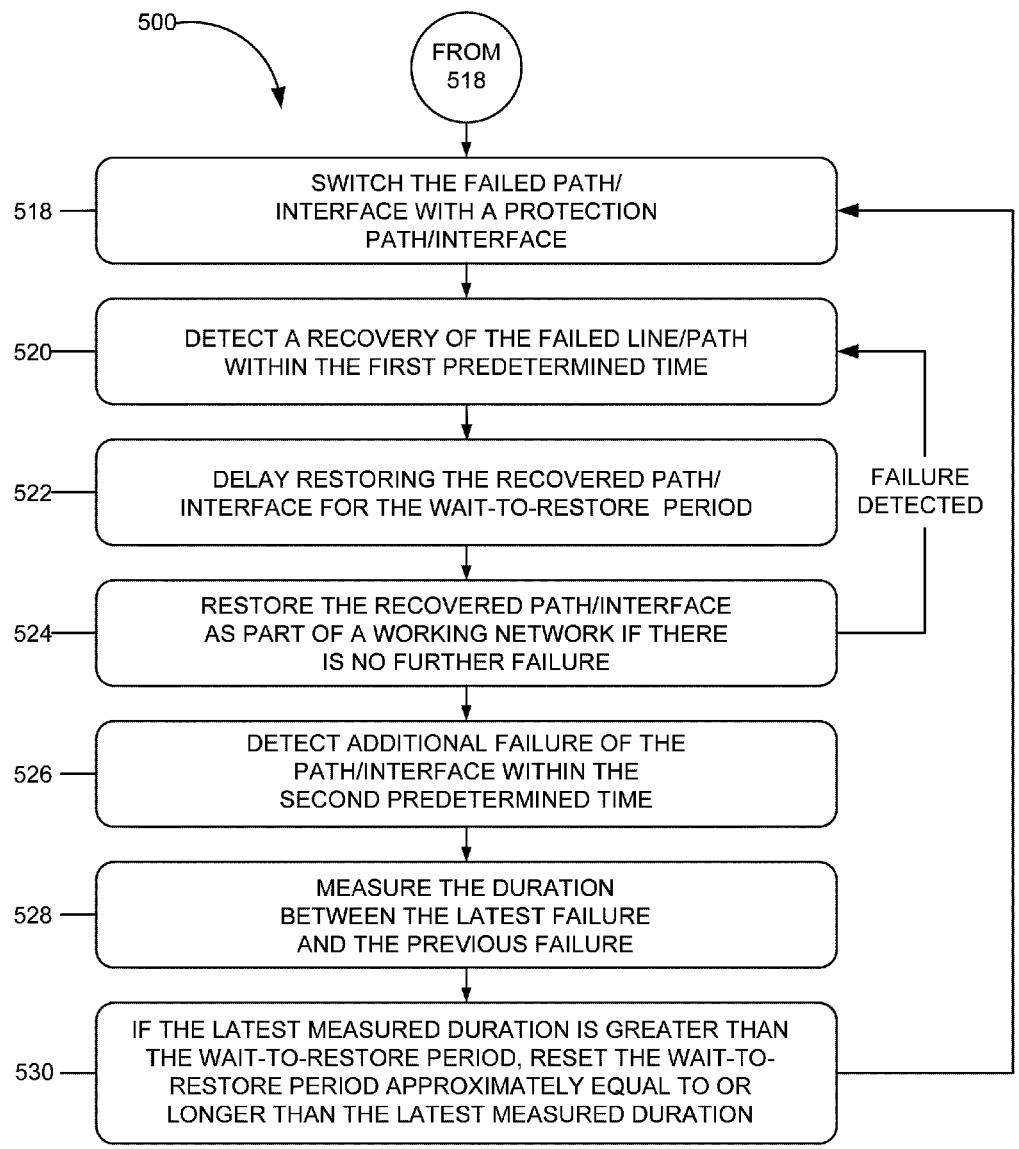

The above paragraphs describe system elements that are related to intelligently restoring network configuration, such as network element 102, support logic 302, EMS/OS 304, agents 306, routing logic 308, RIM logic 402, and IWTR logic 404. FIGS. 5A and 5B depict an exemplary process that is capable of being performed on one or more of these system elements.

As shown in FIG. 5A, process 500, at 502, may detect a first failure in a path/interface. In one example, the failure may be detected at one of interfaces 206 via one of agents 306. The detection may be triggered by a loss of signal (LOS), signal degradation alarm indication signal (AIS), loss of frame, etc. In another example, the failure may be detected at a remote router that sends information about a failed path/interface through one of a routing message, alarms, or reports to EMS/OS 304. If EMS/OS 304 is notified, EMS/OS 304, in turn, may notify all routers under its management about the failure. In some implementations, IWTR logic 404 may withhold sending an alarm or a problem report until a recovery has been made in response to the failure.

The failed path/interface may be switched with a spare path/interface (i.e., a protection path/interface) (block 504). If the switching occurs at the physical layer (i.e., layer 1 of the OSI model), the protection path/interface may be pre-determined and the switching may be performed by one of agents 306 or a specialized program that is part of support logic 302. If the switching occurs at layer 2 or 3 of the OSI model, the protection path/interface may be dynamically determined based on various network conditions, such as congestion, weighting factors that are associated with available paths (e.g., cost), a hop count, etc. In such instances, the switching may be performed by making changes to the RIB. After the RIB update, packets may be routed in accordance with the changes in the RIB. Whether switching the failed path/interface occurs at layer 2 or 3 the OSI model, IWTR logic 404 may send out an alarm and/or a problem report. The alarm/problem report may provide the time of failure, the amount of time that elapses before a recovery is made, severity of the failure, description of the failure/recovery, a port number of the device where the failure/recovery is detected, etc.

At block 506, a recovery of the failed path/interface may be detected within a first predetermined time. The detection may occur at different layers of networking. For example, one of agents 306 may detect a recovery of one of interfaces 206 (e.g., physical layer) and EMS/OS 304 and/or IWTR logic 404 may be notified. In another example, IWTR logic 404 may receive updated path information from a remote device and may determine that the update indicates a recovered route. The recovery may involve recuperation from different types of events, such as a power failure or network congestion. In some instances, the recovery may not occur, and process 500 may terminate after the first predetermined time, which may be set by a network administrator or by a component in network element 102. As at block 502, IWTR logic 404 may send an alarm/problem report to EMS/OS 304.

Restoring the recovered path/interface may be delayed for a wait-to-restore period (block 508). As at block 502, IWTR logic 404 may either send an alarm/problem report to EMS/OS 304 or a restore. If sent, the alarm/problem report may include a wait-to-restore period.

The wait-to-restore period may be set by a network administrator or by IWTR logic 404 during the previous restoration of the path/interface, for example, to a value between 5-12 minutes. The wait-to-restore period may be set at other values, depending on network elements that are included in the network and/or the network configuration. The path/interface recovery can be temporary, and observing stability in the path/interface for the wait-to-restore period before restoring the path/interface may increase the chance that the path/interface does not fail again immediately. Switching back and forth between the recovered path/interface and the protection path/interface may not be desirable, as the switching itself may introduce additional network delays and instability.

At block 510, the recovered path/interface may be restored to the network if there is no further failure during the wait-to-restore period. If there is another failure during the wait-to-restore period, the recovered path may not be restored to the network, and process 500 may return to block 506. In many instances, if the recovered path/interface is restored, the recovered path/interface may revert to its configuration prior to the failure. For example, a failed network interface which has been experiencing momentary power fluctuations may recover and be returned to its configuration prior to the power fluctuations. In other instances, if additional changes are made to the network during the recovery of the path/interface, the path/interface may be reconfigured to be part of a different network path. For example, if an input interface to a router fails and recovers and if a number of outgoing interfaces on the same router fails during the recovery of the input interface, the original paths that have been available prior to the failure may not be restored. In many implementations, if the recovered path/interface is restored, EMS/OS that controls agents 306 in network element 102 may be notified of the restoration, through either IWTR 404 and/or agents 306.

A second failure of the same path/interface may be detected within a second predetermined time (block 512). In response to the failure, IWTR logic 404 may send another alarm/problem report to EMS/OS 304. The alarm/report may include a description of the second predetermined time (e.g., the duration), in addition to other information.

If the second failure is not detected within the second predetermined time, process 500 may time out and may begin anew at block 502. The second predetermined time may have been set by a network administrator, and may be, for example set to 20-30 minutes, depending on the network configuration and the network elements.

At block 514, the duration of time between the first failure and the second failure may be measured and, at block 516, the wait-to-restore period may be set approximately equal to or longer than the measured duration. One reason behind setting the wait-to-restore period at least to the duration of time between the first and the second failures may be that restorative activities may take time and, therefore, may introduce further network delays. By choosing to wait at least as long as the expected time of the next failure, it may be possible to ascertain that the recovery is more likely to be stable. Another reason behind setting the wait-to-restore period to the duration of time between the first failure and the second failure may be that the first failure followed by a restore and another failure may be part of a recurring pattern. By setting the wait-to-restore to span a period of time that is longer than to the time between the failures, it may be possible to break the pattern.

As further illustrated in FIG. 5B, the failed path or the interface may be switched with a protection interface or a path (block 518). Switching may be performed in a manner similar to that described for block 504. If the switching occurs at the layer 2 or 3 of the OSI model and the protection path/interface is dynamically determined, the protection interface or the path may be different from the protection interface at block 504, as network conditions may have changed.

At block 520, a recovery of the failed path/interface may be detected. In addition, alarm/problem report may be sent. At block 522, restoring the recovered path/interface may be delayed for the wait-to-restore period. At block 524, the recovered path/interface may be restored to the network if there is no further failure within the wait-to-restore period. If there is another failure within the wait-to-restore period, the recovered path/interface may not be restored, and process 500 may return to block 520. Detecting the recovery at block 520, delaying the restore at block 522, and restoring the recovered path/interface at block 524 may be performed similarly to the corresponding acts at blocks 506, 508, and 510, respectively. At blocks 520-522, proper alarms/problem report may be sent to EMS/OS 304 as at blocks 506-510.

Additional failures of the path/interface may be detected within the second predetermined time (block 526) and the time between the latest failure and the previous failure may be measured (block 528). Any further failures may be indicative of the persisting failure pattern and may be detected to determine the future wait-to-restore periods. Detecting the failed path/interface and measuring the time between the latest failure and the previous failure may be performed similarly to the corresponding acts at blocks 512 and 514, respectively. In addition, an alarm/problem report may be sent to EMS/OS 304.

At block 530, if the latest measured duration is greater than the previous wait-to-restore period, the wait-to-restore period may be reset approximately equal to or longer than the latest measured duration. After block 530, process 500 may continue at block 518.

Many changes to the components and the process for intelligently restoring network configuration as described above may be implemented. In some implementations, IWTR logic 404 may be implemented within a remote or a local EMS/OS 304 that control agents 306 to reconfigure network elements, interfaces, etc. In other implementations, IWTR logic 404 may be integrated into or may interoperate with low level switching logic, such as automatic protection switching (APS) for SONETs (e.g., a bidirectional line switched ring (BLSR), a unidirectional path-switched ring (UPSR), linear 1+1 system, etc.).

Figure 6:
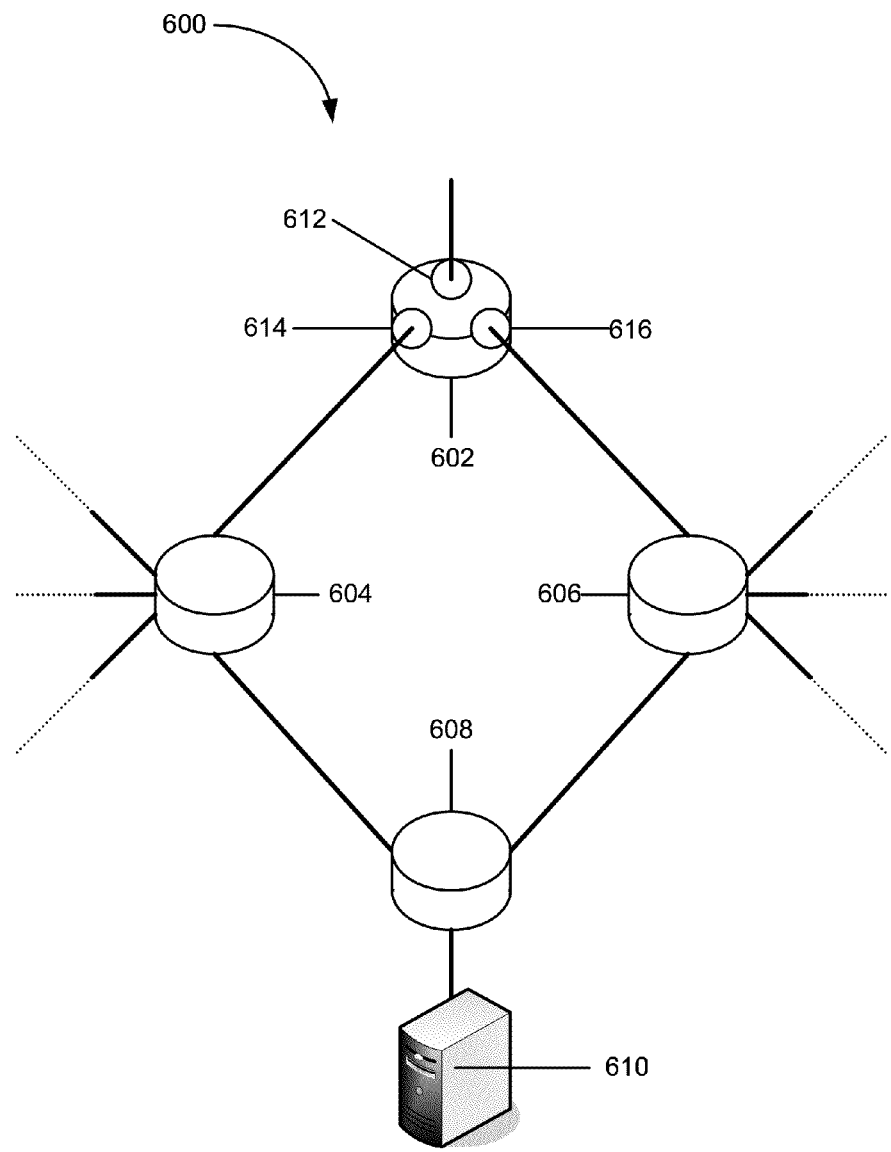
FIG. 6 illustrates an example of intelligently restoring a network.

The following example, together with FIG. 6, illustrates processes that may be involved in restoring a recovered path/ interface to a network after one or more failures in accordance with implementations described with respect to FIGS. 2-4.

The example is consistent with the exemplary processes described above with reference to FIGS. 5A-5B.

FIG. 6 shows an exemplary network 600 in which a router 602 may intelligently restore a path/interface to a network 600. As shown, network 600 may include routers 602-608 and a server 610, which may provide various services to clients (e.g., browsers). Router 602 may include interfaces 612-616. In the example, interface 616 may operate as a spare to interface 614. If interface 614 fails, packets that normally travel through interface 614 may be routed through interface 616.

Assume that working interface 614 fails due to a temporary loss of power and the failure is detected by one of agents 306 on router 602, which reports the failure to a managing EMS/OS. When RIM logic 402 within router 602 updates routes in its RIB, the route that includes interface 614 and router 604 to reach router 608 is switched with the route that includes interface 616 and router 606. Upon detection of the failure, agents 306 send an alarm/problem report to EMS/OS 304.

About 10 minutes after the failure, interface 614 recovers. The recovery is detected by the agent, which notifies the recovery to EMS/OS 304 and IWTR logic 404 via an alarm. IWTR logic 404 delays restoring interface 614 for a wait-to-restore period, which, in this example, is preset to 7 minutes. After 7 minutes, as there is no additional failure, IWTR logic 404 modifies the RIB, via RIM logic 402, so that the original route that includes interface 614 and router 604 may be restored in the RIB. IWTR logic 404 may report the changes to EMS/OS 304.

After the restoration, interface 614 fails again. IWTR logic 404 is notified of the failure and, in response, measures the duration of time between the first failure and the second failure. In addition, IWTR logic 404 sets the wait-to-restore period to the measured duration. The failure causes router 602 to replace the route that includes interface 614 and router 604 in the RIB. The changes in router 602 are detected by one or more of agents 306 and IWTR logic 404 and reported to the EMS/OS 304.

After the switch, interface 614 recovers and its recovery is detected by the agent for interface 614. The agent sends an alarm to IWTR logic 404 and/or the EMS/OS 304. Restoring interface 614 is delayed for the wait-to-restore period. However, assume there are no additional failures, and the route that includes interface 614 and router 604 is thus restored to the network via changes in the RIB. Interface 614 operates without additional problems. If IWTR logic 404 detects no additional problems, IWTR logic 404 may send a report to EMS/OS 304 indicating that the restoration is complete.

The above example illustrates how a path/interface may be intelligently restored after a recovery. By restoring a recovered path/interface to a network based on information about the past failures, unnecessary switching and network service delays associated with the switching may be avoided. In addition, by setting the wait-to-restore to a period of time that is equal to or longer than the time between the consecutive failures, it may be possible to break the failure pattern. Furthermore, by sending alarms and/or problem reports to other systems at critical junctures during the restore, the system may inform other devices and/or operators of network failures and resolutions of the failures.

The foregoing description of implementations provides an illustration, but is not intended to be exhaustive or to limit the implementations to the precise form disclosed. Modifications and variations are possible in light of the above teachings or may be acquired from practice of the teachings.

For example, EMS/OS 304 in the above may be replaced with different network management components, such as a craft (e.g., a local network management node), a Network Management System (NMS), or other types of system for monitoring and managing network devices and/or components.

In another example, IWTR logic 404 may withhold producing a report until a network is fully restored, to avoid generating reports, messages, or notifications that may appear spurious or redundant. In the report, a summary of failures, recoveries, and a restore may be provided in place of a full description.

In addition, while a series of blocks have been described with regard to the process illustrated in FIGS. 5A and 5B, the order of the blocks may be modified in other implementations. For example, block 510 may be performed before block 506. Further, non-dependent blocks may represent blocks that can be performed in parallel. For example, blocks 502-530 that are performed for one path/interface may be independent of blocks 502-530 for a second paths/interface and, therefore, may be performed in parallel to blocks 502-530 for the second path/interface. Further, it may be possible to omit blocks 504-516.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   one or more processors, configured to:
      detect a first failure of a working path in a network;
      detect a first recovery of the working path that is reintegrated into the network in response to the first recovery;
      detect a second failure of the working path subsequent to the first failure and after the detection of the first recovery, wherein the working path has operated without an intervening failure between the first failure and the second failure;
      determine an elapsed time between an occurrence of the first failure and an occurrence of the second failure;
      detect a second recovery of the working path after the second failure; and
      reintegrate the working path as part of the network after waiting for at least a duration of the elapsed time after the second recovery,
   wherein any failure of the working path includes malfunction of any device or component in the working path or includes a failure, of any device or component, in the working path, to no longer provide a required quality-of-service.

2. The device of claim 1, wherein the device includes a router.

3. The device of claim 2, wherein the working path includes:
   a multiprotocol label switched (MPLS) path, a layer 2 network path, or a layer 3 network path.

4. The device of claim 1, wherein the device includes:
   an element management system (EMS) that supports a transaction language interface (TLI).

5. The device of claim 1, further comprising:
   a memory to store a routing information base (RIB), wherein the one or more processors are further configured to:
      reintegrate the working path into the network by changing the RIB.

6. The device of claim 1, wherein when the one or more processors detect the second recovery of the working path, the working path has recovered an ability to carry data in its original capacity prior to the second failure of the working path.

7. The device of claim 1, wherein the one or more processors are further configured to generate alarms.

8. The device of claim 7, wherein each of the alarms includes at least one of:
   a time of failure, a type of failure; or severity of failure.

9. The device of claim 1, wherein when the one or more processors detect the second failure of the working path, the one or more processors are configured to detect a signal degradation alarm indication signal associated with the working path.

10. The device of claim 1, wherein the one or more processors are further configured to:
    switch a spare path with the working path when the one or more processors detect a third failure of the working path due to congestion in the network.

11. The device of claim 1, wherein when the one or more processors reintegrate the working path as part of the network, the one or more processors are configured to reintegrate the working path recovered from power failure.

12. The device of claim 1, wherein the one or more processors are further configured to:
    send a problem report when the working path does not recover after a third failure of the working path.

13. The device of claim 1, wherein the one or more processors are further configured to control components on behalf of a remote element management system (EMS).

14. The device of claim 1, wherein the one or more processors are further configured to:
    dynamically determine a protection path to replace the working path based on network conditions.

15. The device of claim 14, wherein the network conditions include:
    congestion, weighting factors associated with different paths, or a hop count.

16. A device comprising:
    one or more processors, configured to:
       detect a first failure of a working path in a network;
       detect a second failure subsequent to the first failure, of the working path;
       determine an elapsed time between an occurrence of the first failure and an occurrence of the second failure;
       detect a recovery of the working path after the second failure; and reintegrate the working path as part of the network after waiting for at least a duration of the elapsed time after the recovery;

detect additional failures of the working path;

determine a longest elapsed time between any consecutive two of the additional failures;

detect another recovery of the working path after a last failure of the additional failures; and reintegrate the working path as part of the network after waiting for at least a duration of the longest elapsed time after the other recovery.

17. A method comprising:

detecting, by a device in a network, a first failure of a working path in the network;

detecting, by the device, a first recovery of the working path that is reintegrated into the network in response to the first recovery;

detecting, by the device, a second failure of the working path subsequent to the first failure and after the detection of the first recovery, wherein the working path has operated without an intervening failure between the first failure and the second failure;

determining, by the device, an elapsed time between an occurrence of the first failure and an occurrence of the second failure;

detecting, by the device, a second recovery of the working path after the second failure; and reintegrating, by the device, the working path as part of the network after waiting for at least a duration of the elapsed time after the second recovery, wherein any failure of the working path includes malfunction of any device or component in the working path or includes a failure, of any device or component, in the working path, to no longer provide a required quality-of-service.

18. The method of claim 17, further comprising:

detecting additional failures of the working path;

determining a longest elapsed time between any consecutive two of the additional failures;

detecting another recovery of the working path after a last failure of the additional failures; and reintegrating the working path as part of the network after waiting for at least a duration of the longest elapsed time after the other recovery.

19. The method of claim 17, wherein the device includes a router.

20. One or more non-transient computer-readable media, comprising computer-executable instructions that, when executed by one or more processors, cause the one or more processors to:

detect a first failure of a working path in a network;

detect a first recovery of the working path that is reintegrated into the network in response to the first recovery;

detect a second failure of the working path subsequent to the first failure and after the detection of the first recovery, wherein the working path has operated without an intervening failure between the first failure and the second failure;

determine an elapsed time between an occurrence of the first failure and an occurrence of the second failure;

detect, by the device, a second recovery of the working path after the second failure; and reintegrate the working path as part of the network after waiting for at least a duration of the elapsed time after the second recovery, wherein any failure of the working path includes malfunction of any device or component in the working path or includes a failure, of any device or component, in the working path, to no longer provide a required quality-of-service.

* * * * *